(12) United States Patent
Lin et al.

(10) Patent No.: US 6,591,029 B1
(45) Date of Patent: Jul. 8, 2003

(54) OPTICAL SWITCH AND METHOD FOR ALIGNING OPTICAL SWITCH COMPONENTS

(75) Inventors: Lih Y. Lin, Little Silver, NJ (US); Nicolas H. Bonadeo, Aberdeen, NJ (US); Jerry I. Dadap, Jr., Red Bank, NJ (US)

(73) Assignee: Tellium, Inc, Oceanport, NJ (US)

( * ) Notice: Subject to any disclaimer, the term of this patent is extended or adjusted under 35 U.S.C. 154(b) by 271 days.

(21) Appl. No.: 09/754,395

(22) Filed: Jan. 5, 2001

(51) Int. Cl.[7] ............................................... G02B 6/35
(52) U.S. Cl. ........................................... 385/17; 385/37
(58) Field of Search ........................ 385/16–18, 20–22, 385/37

(56) References Cited

U.S. PATENT DOCUMENTS

| | | | |
|---|---|---|---|
| 5,255,332 A | * 10/1993 | Welch et al. ................. | 385/17 |
| 6,275,630 B1 | 8/2001 | Yang et al. .................... | 385/37 |
| 6,411,751 B1 | * 6/2002 | Giles et al. .................... | 385/16 |
| 6,430,331 B1 | * 8/2002 | Hagelin et al. ................ | 385/17 |
| 6,473,211 B2 | * 10/2002 | Stone ........................... | 359/117 |
| 6,483,962 B1 | * 11/2002 | Novotny ....................... | 385/18 |

\* cited by examiner

*Primary Examiner*—John D. Lee
*Assistant Examiner*—Sarah U Song
(74) *Attorney, Agent, or Firm*—Jeffery J. Brosemer (57) ABSTRACT

An optical switch having a fiber/lens array and a switching substrate may be properly aligned using one or more grating(s) provided on the switching substrate. The grating(s) may be designed to have a predetermined response when the fiber/lens array and switching substrate are properly aligned. For example, the grating(s) may reflect incident light back into an input fiber, where the back-reflected light may be detected. Accordingly, the position of the switching substrate and/or fiber/lens array may be adjusted until back reflected light having predetermined power is detected.

20 Claims, 9 Drawing Sheets

OPTICAL SWITCH AND METHOD FOR ALIGNING OPTICAL SWITCH COMPONENTS

RELATED APPLICATIONS

This application is related in subject matter to U.S. application Ser. No. 09/754,254, filed concurrently herewith and expressly incorporated by reference herein.

BACKGROUND OF THE INVENTION

The present invention relates to an optical switch and a method for aligning components of an optical switch.

Increasing demands for high-speed Internet service and wireless communications are soon expected to outstrip current telecommunications capacity. Because optical fiber networks are capable of transmitting huge volumes of data at blinding speeds, telecommunications carriers are turning to optical fiber networks in an effort to meet future needs.

In order to implement optical fiber networks of the future, the telecommunications industry needs new optical devices that are inexpensive, efficient, and scalable to accommodate future optical telecommunications network expansion. Telecommunications providers prefer optical fiber networks that can be reconfigured quickly and efficiently. This gives the optical network the flexibility to accommodate growth and changes in future communications patterns. The ability to reconfigure quickly and efficiently also enables the network to restore failed communications by rerouting the communications to bypass the failure.

Optical fiber networks can be reconfigured at network nodes using optical switches to change the coupling between incoming optical fibers and outgoing optical fibers. Currently under development are optical switches that use movable micro-mirrors. These optical switches couple the optical signals between input and output fibers entirely in optical form, instead of converting the optical signals to electrical signals, switching the electrical signals, and converting the switched electrical signals back to optical signals.

To successfully operate such switches, the switch components—including fibers, lenses, and the micro-mirrors—must be properly aligned and the angular position of the movable micro-mirrors must be precisely controlled. If the components are not properly aligned, some or all of the light from the input fibers will not reach the selected output fiber. There remains a need in the art for an optical switch having components that may be easily and accurately aligned and a method for aligning the switch components.

SUMMARY OF THE INVENTION

The present invention has been made in view of the above circumstances and has as an object to provide an economical optical switch having components that may be easily aligned.

A further object of the invention is to provide a method for aligning components of an optical switch.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiment(s) of the invention and together with the description, serve to explain the principles of the invention.

DESCRIPTION OF THE PREFERRED EMBODIMENT

Reference will now be made in detail to the present exemplary embodiment(s) of the invention illustrated in the accompanying drawings. Wherever possible, the same reference numbers will be used throughout the drawings to refer to the same or like parts.

Figure 1:
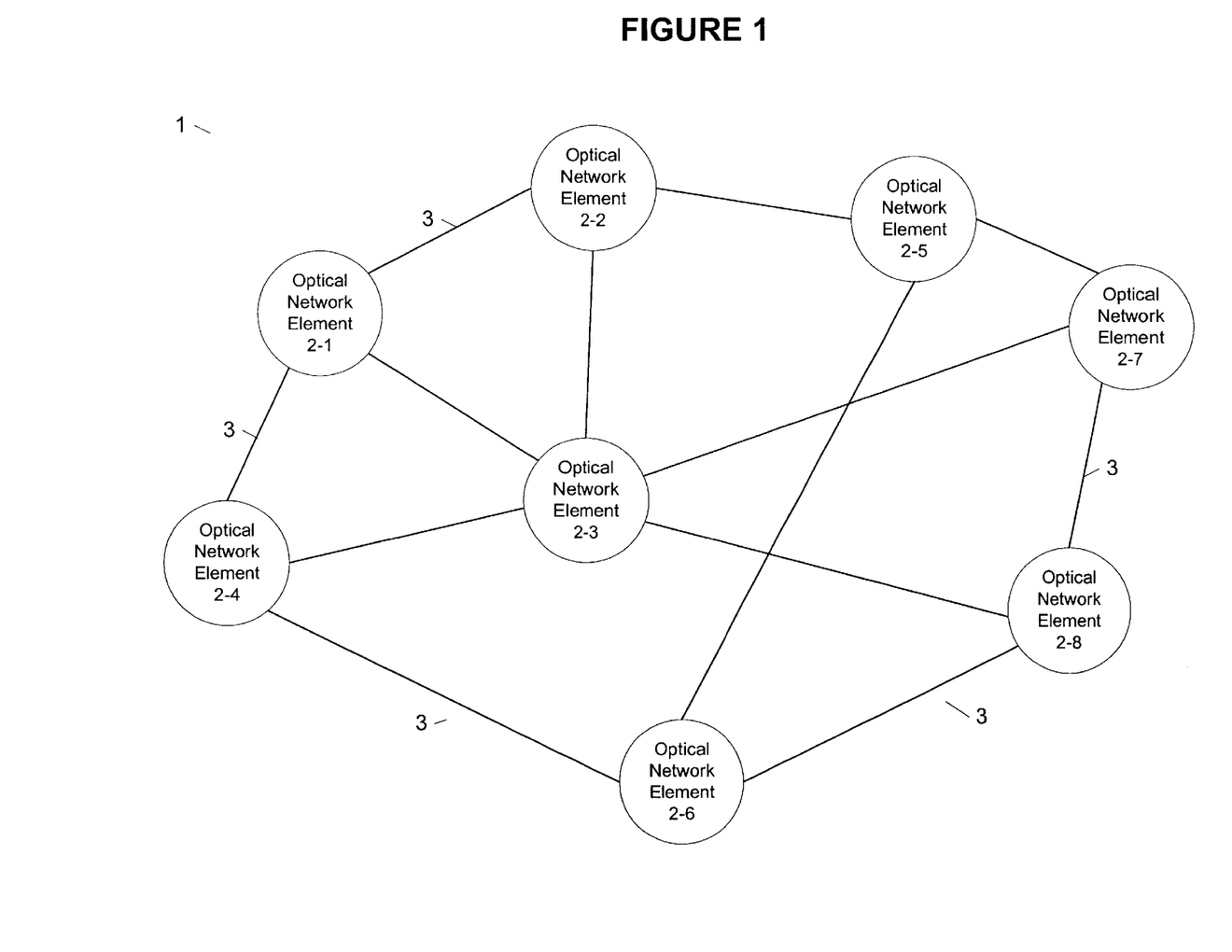
FIG. 1 provides a schematic of an illustrative optical network in accordance with the present invention.

The present invention is useful in optical switches for optical telecommunications network systems that carry optical communications signals, such as wavelength division multiplexed (WDM) signals, over optical fibers. FIG. 1 illustrates an exemplary embodiment of an optical mesh communications network 1. While FIG. 1 illustrates an optical mesh network, the present invention may be used in connection with other optical network architectures, such as ring, chains, and stars, among others, as well as other optical applications. As shown, the network 1 includes optical network elements 2-1 to 2-8 interconnected through optical links 3 in a mesh pattern. Of course, the number of optical network elements 2 and interconnections shown in FIG. 1 is intended as an example only. It should be clear that the present invention is applicable with different numbers and/or interconnections of network elements 2. The optical links 3 are shown generally and may encompass different numbers of optical paths and different physical paths between the network elements 2. The optical links 3 may include, for example, optical fiber.

In general, the optical network elements 2 communicate information signals to other optical network elements through the optical links 3. The optical network elements 2 may include optical cross-connects, add-drop multiplexers, or other switching equipment to allow the signals carried on the optical links 3 to be transmitted through the network elements 2, as necessary, from source to destination. In addition, and not shown in FIG. 1, the optical network elements 2 may be connected to information sources (ingresses) and destinations (egresses) in the locality of that optical network element 2. Thus, for example, information signals may enter the optical mesh network 1 at a local connection to network element 2-1. The information signals may be converted to optical signals, if they are not already, and then travel in the optical network 1 from network element 2-1, through network elements 2-4 and 2-6, and to network element 2-8, where it is passed to a destination in the locality of network element 2-8.

Figure 2:
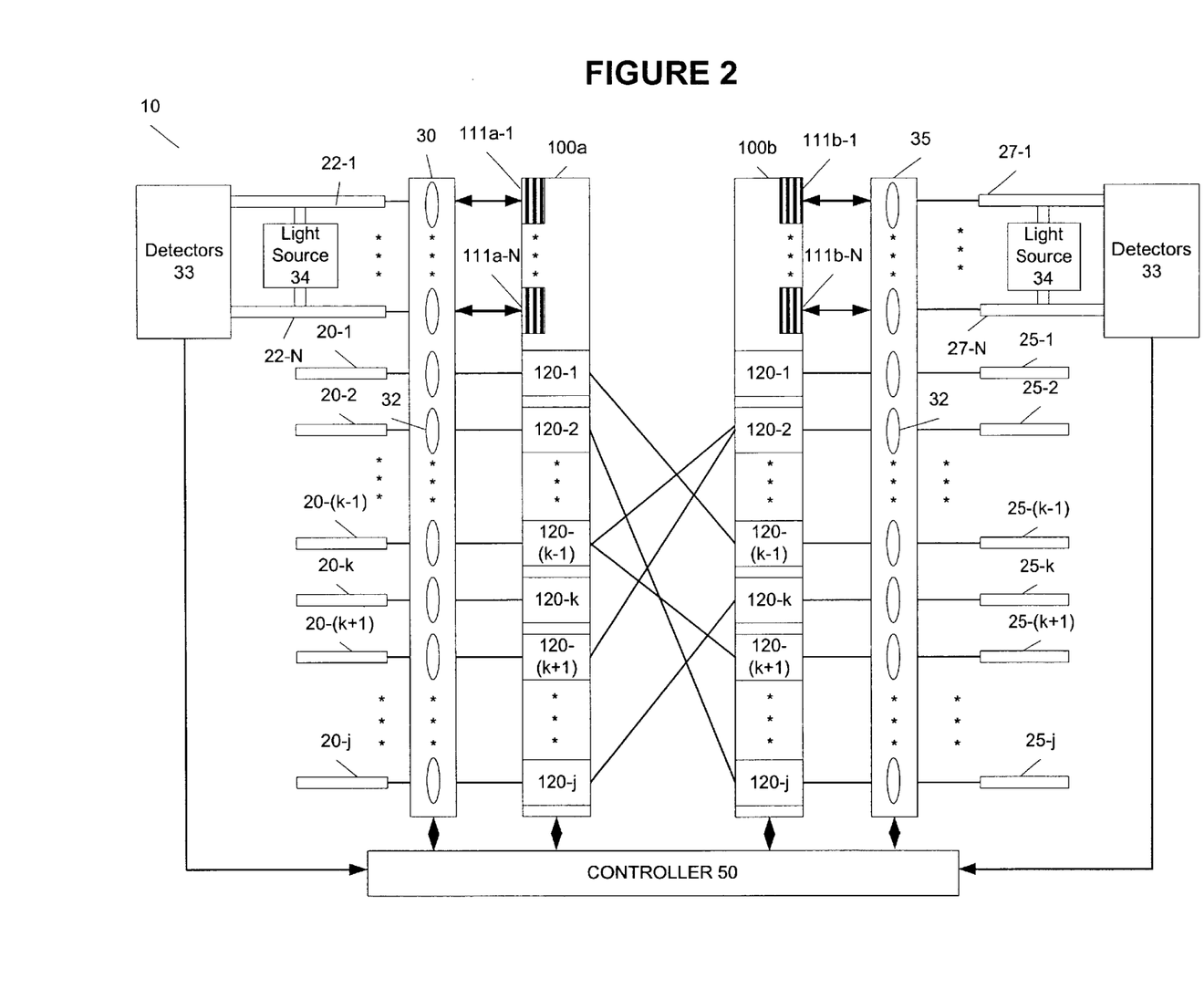
FIG. 2 provides a schematic of an exemplary optical switch in accordance with the present invention.

FIG. 2 illustrates a schematic of such an exemplary optical switch 10 in accordance with the present invention. Optical switch 10 may be located in an optical network element 2, such as shown in FIG. 1. The optical switch 10 according to the present invention may be configured as an optical cross connect (OXC), an add-drop multiplexer (ADM), or another optical switch arrangement.

The optical switch 10 switches optical signals from a plurality of input optical fibers 20-1 to 20-j (collectively "input optical fibers 20") to selected output fibers 25-1 to 25-j (collectively "output optical fibers 25"). The optical signals may be provided, for example, from a local ingress or from another node 2 and may be selectively provided to a selected node 2 or local egress. The present invention is not limited by the types of the optical signals carried by the input optical fibers 20 and output optical fibers 25. Each optical input fiber 20 may carry WDM signals, a single wavelength optical signal that was demultiplexed from a WDM signal by a wavelength division demultiplexer, or other types of optical signals. Similarly, each optical output fiber 25 may carry WDM signals, single wavelength optical signal to be multiplexed with other optical signals by a wavelength division multiplexer, or other types of optical signals. The optical signals typically carry information and may have wavelengths of about 1300–1500 nm, for example. While FIG. 2 shows a schematic of an embodiment with j input optical fibers 20 and j output optical fibers 25, the number of input optical fibers 20 may differ from the number of output optical fibers 25.

Optical switch 10 may further include input optical fibers 22-1 to 22-N (collectively "input optical fibers 22") and one or more output optical fibers 27-1 to 27-N (collectively "output optical fibers 27"). The number of input optical fibers 22 and the number of output optical fibers 27 may differ, of course. Input optical fibers 22 and output optical fibers 27 may be used for alignment purposes, as discussed further below. In the embodiment shown in FIG. 2, fibers 22 and 27 are coupled to light source 34 and to detectors 33, as shown schematically in FIG. 2. Light source 34 launches optical signals into fibers 22 and 27. Light source 34 may be for example, a light-emitting diode, a laser, or other light source, or a group of such devices provided for fibers 22 and 27. For example, one or more fibers 22, 27 may be coupled to each such device. Detectors 33 detect optical signals propagating in fibers 22 and 27 in a direction opposite to the optical signals output from light source 34.

The input optical fibers 20, 22 and output optical fibers 25, 27 may be arranged in any way, for example a rectangular array, such as a square array. Alternatively, input optical fibers 22 may be provided outside of or interspersed within an array of fibers 20. Similarly, output fibers 27 may be provided outside of or interspersed within an array of fibers 25. In an exemplary embodiment, fibers 22 and 27 are provided at the periphery of the arrangement of fibers.

The input optical fibers 20, 22 carry optical signals that are supplied, respectively, to a lens array 30. The lens array 30 may include a plurality of micro-lenses 32 arranged in an array. The micro-lenses 32 are preferably arranged so that each input optical fiber 20 and 22 is aligned with a micro-lens 32. In this way, optical signals emitted from an input fiber 20, 22 will pass through one of the micro-lenses 32. Alternatively, the lens array 30 may be integrated with the ends of fibers 20, 22. The input fibers 20, 22 and lens array 30 may collectively be considered a fiber/lens array. The micro-lenses 32 direct optical beams from the input optical fibers 20 to a first switching substrate 100a, which will be described in greater detail below.

The first switching substrate 100a includes a plurality of gratings 111a-1 to 111a-N (collectively referred to as "gratings 111a") and a plurality of switching elements 120. The switching elements 120 may be arranged in an array, e.g., a rectangular or square array. Gratings 111a may be arranged at the periphery of the array of switching elements 120 or interspersed within the array of switching elements 120. Alternatively, the gratings 111a and switching elements 120 may together form an array, e.g., a rectangular or square array. Of course, other arrangements of the gratings 111a and/or switching elements 120 may be used as well.

According to one embodiment of the invention, the gratings 111 are planar reflective or blazed gratings. Gratings 111a are located on the switching substrate 100a so that, when fiber/lens array 20,22/30 and switching substrate 100a are properly aligned, optical signals from input optical fibers 22 pass through lenses 32, strike gratings 111a, at least a portion of the incident optical signals are reflected back through lenses 32 and into fibers 22, and are detected by detectors 33. If the switching substrate 100a and fiber/lens array 20,22/30 are misaligned, light from at least one fiber 22 and emitted from a lens 32 will not be reflected back into the fiber 22 by grating 111a. Accordingly, detectors 33 will not detect back-reflected light from gratings 111a in each of the fibers 22.

The switching elements 120 of switching substrate 100a may include, for example, micro-mirrors. In a preferred embodiment, each input optical fiber 20 corresponds to one micro-lens 32 of the first lens array 30 and one micro-mirror switching element 120 of the first switching substrate 100a. Using the switching elements 120 and responsive to control signals, the first switching substrate 100a couples the optical signals from the fibers 20 to selected switching elements 120 of a second switching substrate 100b.

The second switching substrate 100b includes gratings 111b-1 to 111b-N (collectively "gratings 111b") and switching elements 120. Similar to the first substrate 100a, the switching elements 120 of the second substrate 100b may be arranged in an array, e.g., a square or rectangular array or other arrangement. Gratings 111b may be arranged at the periphery of the substrate 100b or interspersed therein. Alternatively, the gratings 111b and switching elements 120 may together form an array, such as a rectangular array. As above, the gratings 111 and switching elements 120 may form other patterns on substrate 100b. The second substrate 100b need not match the first substrate 100a.

Gratings 111b may be, for example, planar reflective or blazed gratings. Gratings 111b are located on the switching substrate 100b so that, when fiber/lens array 25,27/35 and switching substrate 100b are properly aligned, optical signals from output optical fibers 27 pass through lenses 32, strike gratings 111b, at least a portion of the incident optical signals are reflected back through lenses 32 and into fibers 27, and are detected by detectors 33. If the switching substrate 100b and fiber/lens array 25,27/35 are misaligned, light from at least one fiber 27 and emitted from a lens 32 will not be reflected back into the fiber 27 by a grating 111b. Accordingly, detectors 33 will not detect back-reflected light from gratings 111b in each of the fibers 27.

Switching elements 120 of substrate 100b may include, for example, micro-mirrors. In a preferred embodiment, each output optical fiber 25 corresponds to one micro-lens 32 of the second lens array 35 and one micro-mirror switching element 120 of the second switching substrate 100b. Using the micro-mirror switching elements 120 and responsive to control signals, the second switching substrate 100b couples optical signals from the first switching substrate 100a to output fibers 25.

In one embodiment, each switching element 120 of the first substrate 100a is preferably movable or otherwise controllable to permit an input beam to be coupled (e.g., reflected) by the switching element 120 to any switching element 120 of the second substrate 100b. The switching elements 120 of the second substrate 100b, also responsive to control signals, receive and couple the optical beams through the second lens array 35 to output optical fibers 25. The fibers 20, 22 and lens array 30 may collectively be considered as a fiber/lens array. The second lens array 35 includes micro-lenses 32, which may be arranged in an array, aligned with output optical fibers 25 and 27. Alternatively, lenses 32 may be integrated with the ends of fibers 25 and 27. Micro-lenses 32 direct the optical beams into output optical fibers 25 and into and out of fibers 27. Accordingly, optical signals carried on input optical fibers 20 may be selectively coupled to output optical fibers 25.

A controller 50 may be used to receive and process sensor signals (e.g., from the detectors 33 and/or from the switching substrates 100a, 100b) and other control inputs and generate output control signals to control the position of the switching elements 120 of the first and second substrates 100a, 100b. The switching substrates 100a and 100b can be controlled to redirect or switch the coupling of optical signals. For example, as shown in FIG. 2, switching element 120-1 of substrate 100a directs an optical signal to switching element 120-(k+1) of substrate 100b. However, responsive to control signals, switching element 120-1 of substrate 100a may redirect the optical signal it receives from input optical fiber 20-1 to switching element 120-2 of substrate 100b. Switching element 120-2 may be controlled to receive the optical signal and provide it to optical fiber 25-2. The controller 50 may be, for example, a computer or application-specific circuitry.

Controller 50 may also generate control signals indicating whether or not the fiber/lens array 20,22/30 is aligned with the first substrate 100a and whether the fiber/lens array 25,27/35 is aligned with the second substrate 100b based on inputs received from detectors 33. Of course, a separate controller may be used for this purpose. The control signals may be simply information signals indicating alignment or misalignment. Alternatively, the control signals may indicate the direction and displacement needed to bring the fiber/lens arrays 20,22/30 and 25,27/35 into alignment with their respective substrates 100a, 100b. A motor mechanism (not shown) may be provided for each of the first lens array/first switching substrate and the second lens array/second switching substrate. The motor mechanism may be responsive to the control signals of the controller 50 to move one or both the lens array 30 (35) and substrate 100a (100b) into alignment. In this way, the combination of fiber/lens array/switching substrate may be automatically aligned.

While FIG. 2 shows a one-stage switching arrangement, one or more additional stages of substrates may be interposed between substrates 100a and 100b to form a multistage switching arrangement.

Figure 3:
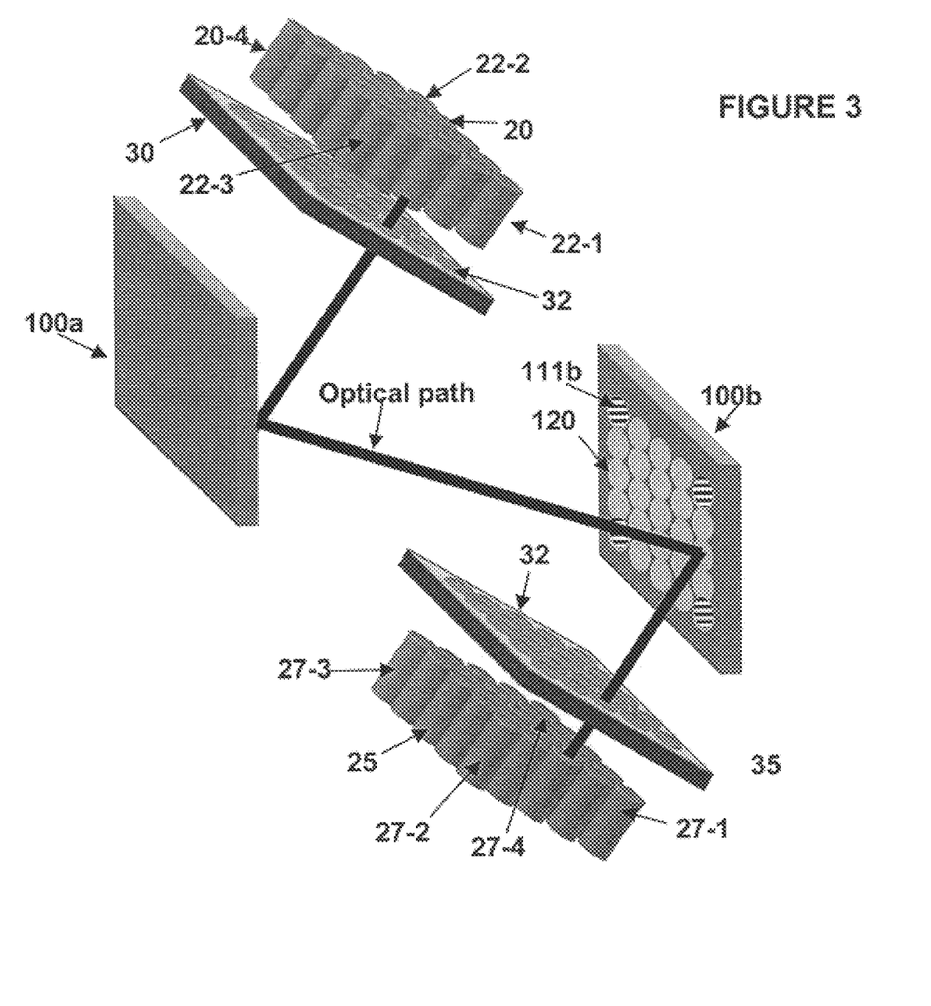
FIG. 3 illustrates an embodiment of an exemplary optical switch having micro-mirrors in accordance with the present invention.

FIG. 3 provides an example of an embodiment of an optical switch 10 according to the schematic of FIG. 2. As shown in FIG. 3, the input optical fibers 20 and 22 together form a two-dimensional rectangular array. In particular, input optical fibers 22-1 to 22-4 are provided at the corners of the array with input optical fibers 20 making up the remainder of the array. Of course, the arrangement of input optical fibers 20 and 22 shown in FIG. 3 is exemplary and other patterns may be used consistent with the present invention. Similarly, output optical fibers 25 and 27 together form a two-dimensional rectangular array in which fibers 27-1 to 27-4 are provided at the corners. Lens arrays 30 and 35 include micro-lenses 32 arranged in arrays and desirably aligned with the input optical fibers 20, 22 and the output optical fibers 25, 27, respectively.

Gratings 111b and switching elements 120 of the second switching substrate 100b are arranged in a rectangular array, with the gratings 111b at the corners. Gratings 111a and switching elements 120 are similarly situated on the first switching substrate 100a. The switching substrate 100a is desirably positioned at an angle $\alpha 1$ with respect to lens array 30. That is, a ray taken normal from the surface of lens array 30 will strike switching substrate 100a at an angle $\alpha 1$ from normal. Switching substrate 100a generally faces the second switching substrate 100b with some offset. The second switching substrate 100b is desirably positioned at an angle $\alpha 2$ with respect to the second lens array 35. In a preferred embodiment, $\alpha 1$ and $\alpha 2$ are equal. Accordingly, an optical path from an input fiber 20 to an output fiber 25 traverses a generally "Z" shaped path, as illustrated in FIG. 3.

To position lens array 30 and switching substrate 100a, an optical signal source 34, such as a light emitting diode, a laser, or other signal source, is coupled to the ends of fibers 22. As noted above, a single optical signal source 34 may be used to generate light for each of fibers 22 or separate optical sources 34 may be used for each fiber 22. The optical signals are emitted from the ends of fibers 22 and collimated by micro-lenses 32. Lens array 30 and switching substrate 100a are moved relative to each other (e.g., by moving lens array 30, substrate 100a or both) until the optical signals are reflected back into the fibers 22 by gratings 111a. The reflected light may be detected by detectors 33. The lens array 30 and switching substrate 100a are properly aligned when detectors 33 detect-reflected signals of predetermined intensity or power from each of fibers 22-1 and 22-4. The predetermined power may be, for example, a maximum power determined during alignment or power that exceeds a predetermined threshold. Lens array 35 and switching substrate 100b may be aligned in a similar manner.

Once properly aligned, the optical switch 10 may be used to selectively couple optical signals from input fibers 20 to selected output fibers 25. As shown in FIG. 3 with a single optical beam, the first lens array 30 receives the input optical beam from the input optical fibers 20 at a micro-lens 32 and directs the input beam to a switching element 120 of the first switching substrate 100a. Depending on the angular position of the switching element 120, the input optical beam is reflected to a selected switching element 120 of the second substrate 100b. The switching element 120 of the second substrate 100b reflects the input optical beam through a lens 32 of the second lens array 35 to a selected one of the output optical fibers 25. Thus, the optical beam passes out of the input optical fiber 20, passes through a lens 32 of the first lens array 30, is reflected by switching elements of the first and second switching substrates 100a, 100b, passes through a lens 32 of the second lens array 30, and is directed into a selected output optical fiber 25.

In a preferred embodiment, switching substrates 100a and 100b are micro-electromechanical system (MEMS) devices. Switching elements 120 may be movable micro-mirrors. For example, switching elements 120 may be gimbaled micro-mirrors capable of pivoting about at least two axes. The axes may be perpendicular to each other. Gratings 111a and 111b may be formed on the substrates 100a, 100b, respectively, using lithographic processing techniques used in the semiconductor arts. Alternatively, gratings may be formed separately and attached to the substrates.

Figure 4:
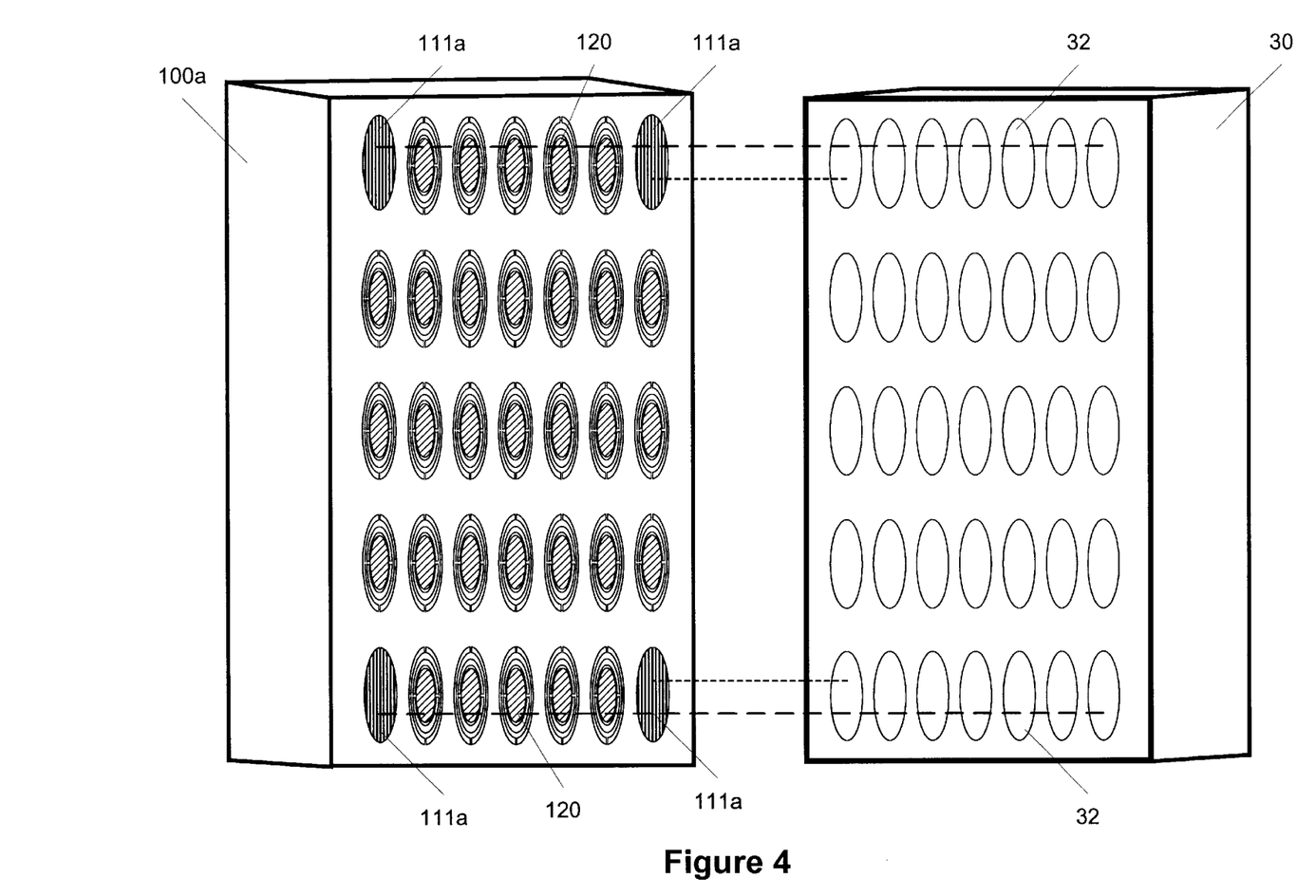
FIG. 4 illustrates the alignment of components of the exemplary optical switch shown in FIG. 3 in accordance with the present invention.

FIG. 4 illustrates components of an exemplary optical switch 10 in accordance with the present invention. In particular, FIG. 4 shows the juxtaposition of the lens array 30 and the first switching substrate 100a. The arrangement of gratings 111a and switching elements 120 on the first switching substrate 100a is similar to that of FIG. 3, except the substrate 100a includes more rows and columns of switching elements 120. As can be appreciated from FIG. 4, the lens array 30 and the switching substrate 100a are canted with respect to each other.

Figure 5:
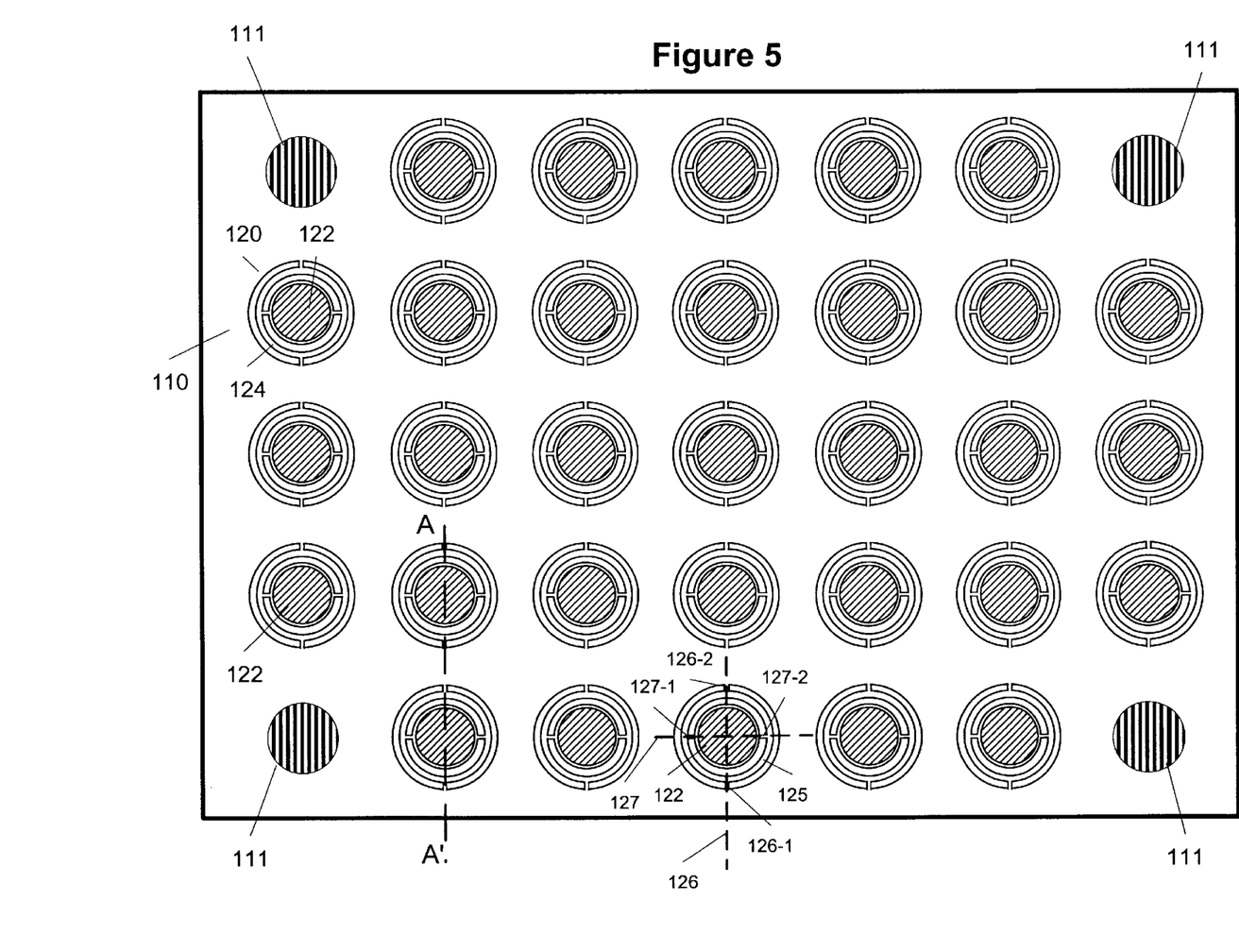
FIG. 5 illustrates an exemplary embodiment of a MEMS array substrate of an optical switch in accordance with the present invention.
Figure 6:
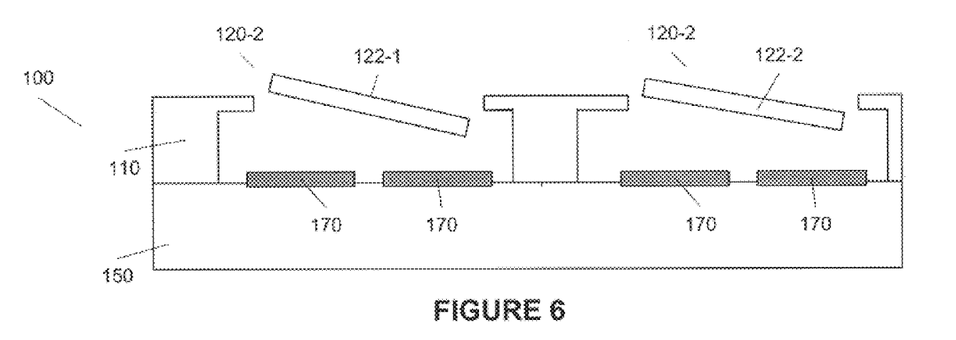
FIG. 6 illustrates a partial cross-section of the embodiment of the MEMS array substrate of FIG. 5.

FIGS. 5 and 6 illustrate a top view and a cross sectional view of an exemplary embodiment of a MEMS micro-mirror substrate 100 in accordance with the present invention. In particular, FIG. 6 represents a partial cross section of the MEMS micro-mirror substrate 100 of FIG. 5 taken along an axis A–A'. As should be apparent, FIGS. 5 and 6 provide simplified illustrations of MEMS micro-mirror substrate 100 for explaining the invention. While FIGS. 5 and 6 described the switching substrate 100 formed using MEMS technology, it should be appreciated that this is exemplary and other technologies may be used consistent with the present invention.

The substrate 100 includes a base 110, which may be formed, for example, of single-crystalline silicon, on which a plurality of gratings 111 and micro-mirrors 122 are formed in an array. More particularly, the base 110 includes a plurality of micro-mirrors 122 and corresponding mirror mounts 124 for mounting the micro-mirrors 122. The micro-mirrors 122 may be formed with a gold coating, for example, to provide a reflective surface. Each micro-mirror 122 and corresponding mirror mount 124 form a movable micro-mirror switching element 120. FIG. 5 shows four gratings 111 and thirty-one movable micro-mirror switching elements 120 for purposes of illustration. Of course, the switching substrate 100 may have more or fewer than four gratings 111 and/or more or fewer than thirty-one movable micro-mirror switching elements 120.

As shown in FIG. 5, each mirror mount 124 may be formed as a gimbal. In particular, the mirror mount 124 includes a mounting arm 125 coupled to the remainder of the base 110 by pivot arms 126-1, 126-2 and coupled to the micro-mirror 122 by pivot arms 127-1, 127-2. Pivot arms 126-1 and 126-2 enable the mounting arm 125, and thus the micro-mirror 122, to pivot with respect to the substrate 110 about a first axis 126. Pivot arms 127-1 and 127-2 enable the micro-mirror 122 to pivot with respect to the mounting arm 125 about a second axis 127 orthogonal to the first axis 126. FIG. 5 shows the mounting arm 125 to be circular for purposes of illustration and not by way of limitation. Of course, the mounting arm 125 may be, for example, rectangular, elliptical, or other closed loop shape, or U-shaped, or arcuate.

Figure 7:
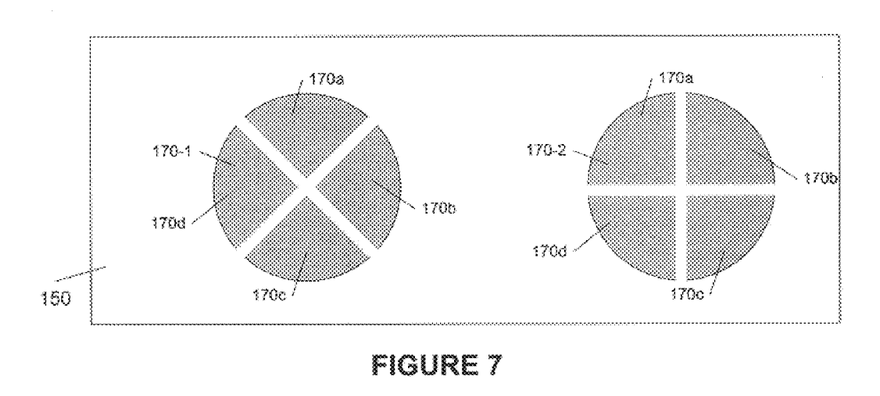
FIG. 7 illustrates a partial top view of an exemplary sub-mount of the MEMS array substrate of FIG. 5.

The micro-mirror substrate 100 further includes a sub-mount 150 beneath the base 110. The sub-mount 150 may be formed, for example, of silicon or another semiconductive material or compound, or an insulative material on which a semiconductive material or compound may be formed. FIG. 7 illustrates a top view of a portion of sub-mount 150 in accordance with an exemplary embodiment of the invention. As shown in FIGS. 6 and 7, the sub-mount 150 includes a plurality of electrodes 170 arranged in groups 170-1, 170-2 corresponding to the movable micro-mirror assemblies 120-1, 120-2 and, in particular, to the micro-mirror 122-1, 122-2 and mounting arm 125 of the movable micro-mirror switching elements 120. Group 170-1 and group 170-2 represent two of several possible orientations of the electrodes 170 relative to the axes 126 and 127. Of course, groups of electrodes 170 of a given sub-mount 150 may have a single orientation or multiple different orientations. Electrodes 170 act on the micro-mirror 122 and mounting arm 125 to control the angular position of the micro-mirror 122 by electrostatic force, for example. In the embodiment of FIGS. 5–7, the electrodes 170a and 170c of electrode group 170-1 control the angular position of the micro-mirror 122-1 about axis 127. Electrodes 170b and 170d of group 170-1 control the angular position of the micro-mirror 122-1 about axis 126. With respect to electrode group 170-2, electrode pairs 170a, 170d and electrode pairs 170b, 170c control the angular position of the micro-mirror 122-2 about axis 126. Electrode pairs 170a, 170b and electrode pairs 170c, 170d of group 170-2 control the angular position of the micro-mirror 122-2 about axis 127. Consequently, by appropriate control of electrodes 170a–170d, the surface angle of micro-mirror 122 may be controlled. Accordingly, the micro-mirror 122 can be used to steer an incident light beam to a particular location, a function useful in optical switches. The design of electrodes 170 in FIG. 7 is intended to be exemplary. It should be understood that other electrode designs may be used in connection with the present invention.

Control circuitry for driving the electrodes 170 may employ analog and/or digital designs. The control circuitry 50, or a portion thereof, may be integrated into the sub-mount 150 or may be provided by one or more separate driver chips. Optical switch 10, and in particular substrates 100a and 100b and lens arrays 30 and 35 may include additional features to facilitate alignment and to facilitate positioning control of the micro-mirrors 122.

Figure 8:
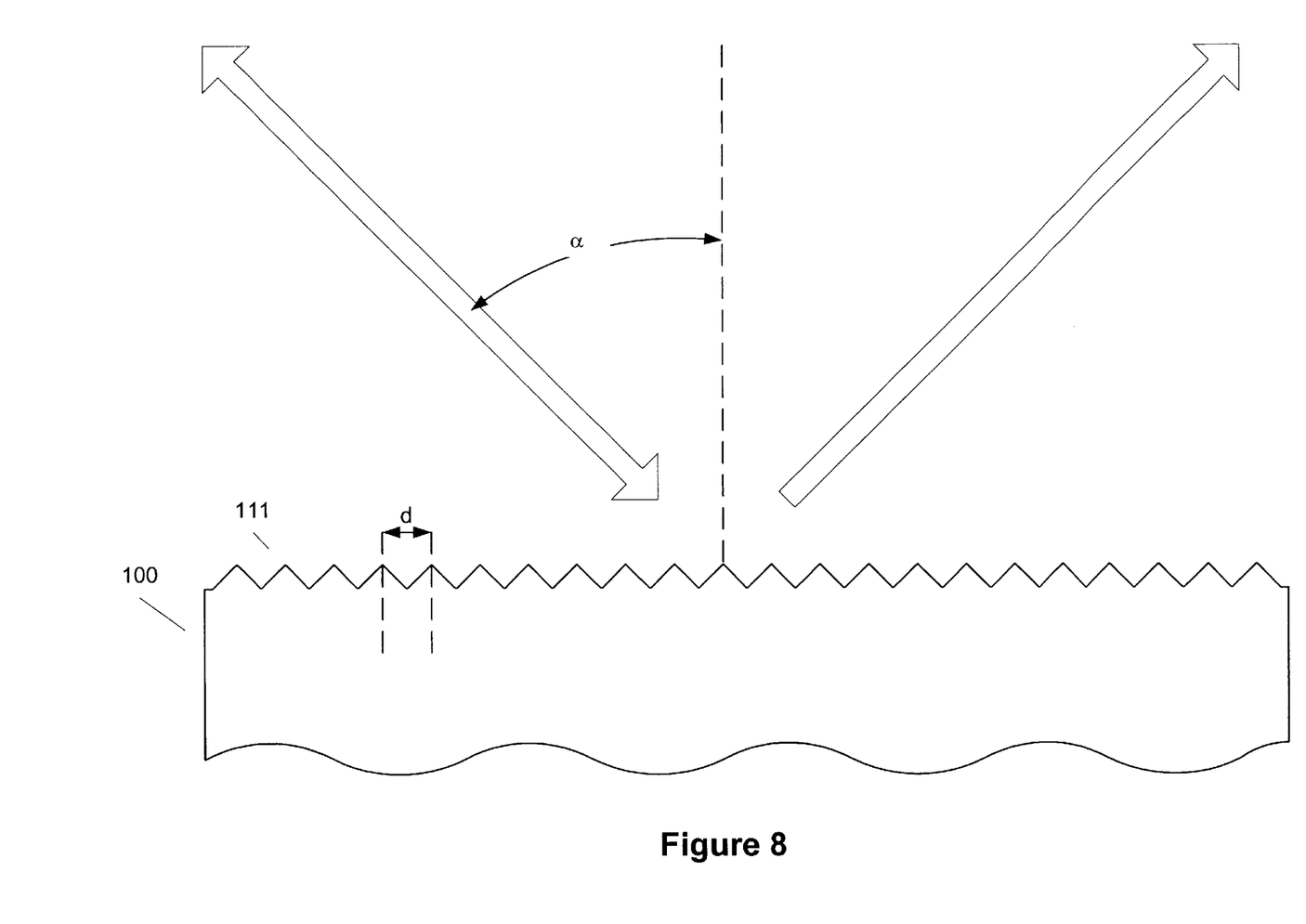
FIG. 8 illustrates a cross-sectional view of a planar grating in accordance with the present invention.

FIG. 8 illustrates an exemplary grating 111 that may be in accordance with the present invention. As noted above, grating 11 may be formed on the surface of switching substrate 100 using, for example, photolithographic techniques or may be formed separately and bonded to the surface of the substrate 100. The grating 111 may be formed by linear grooves or by curved grooves, such as concentric circular grooves, or by another configuration. As shown in FIG. 8, grating 111 may be designed so that a first order component of light incident to the grating at an angle $\alpha$ will be retro-reflected back at an angle $\alpha$. Other components of the incident light may be reflected at other angles. If the grating 111 is designed so that $\alpha$ is the desired angle between the lens array and the switching substrate, grating 111 will reflect light from the lens array directly back to the lens array at the same angle $\alpha$. The retro-reflected light will be inserted back into the fiber 22 for detection by detector 33. The output of detector 33 may therefore be monitored to determine if the lens array and the switching substrate are oriented and aligned properly. The area of the grating may be smaller than the cross-section of the optical beam, so that if there is any lateral misalignment between the grating and the Gaussian optical-beam, the output signal intensity of the detector 33 will decrease.

As an example, for a general grating without blazed angle, the first order component of light reflected by grating 111 will behave in accordance with the following relationship:

$$2d\sin \alpha = \lambda \quad (1)$$

where α is the angle of incident light, α is the wavelength value of the incident light, and d is the groove spacing of the grating.

The angle of incidence of light from lens array 30 on substrate 100 depends on the orientation of the lens array relative to the substrate 100. The desired angle α between the substrate 100 and the lens array 30 may be, for example, between 15°–30°, depending on the implementation. By way of example, if α is 20°, the groove spacing will be 1.9 μm for incident light of wavelength 1.3 μm and the groove spacing will be 2.19 μm for incident light of 1.5 μm.

The size of the grating 111 may be set to the width of the waist of the incident optical beam. In this case, fine adjustment of the orientation of the switching substrates 100a, 100b and lens arrays 30, 35 can be made by monitoring the back-reflected light in the optical fibers 22, 27.

Figure 9:
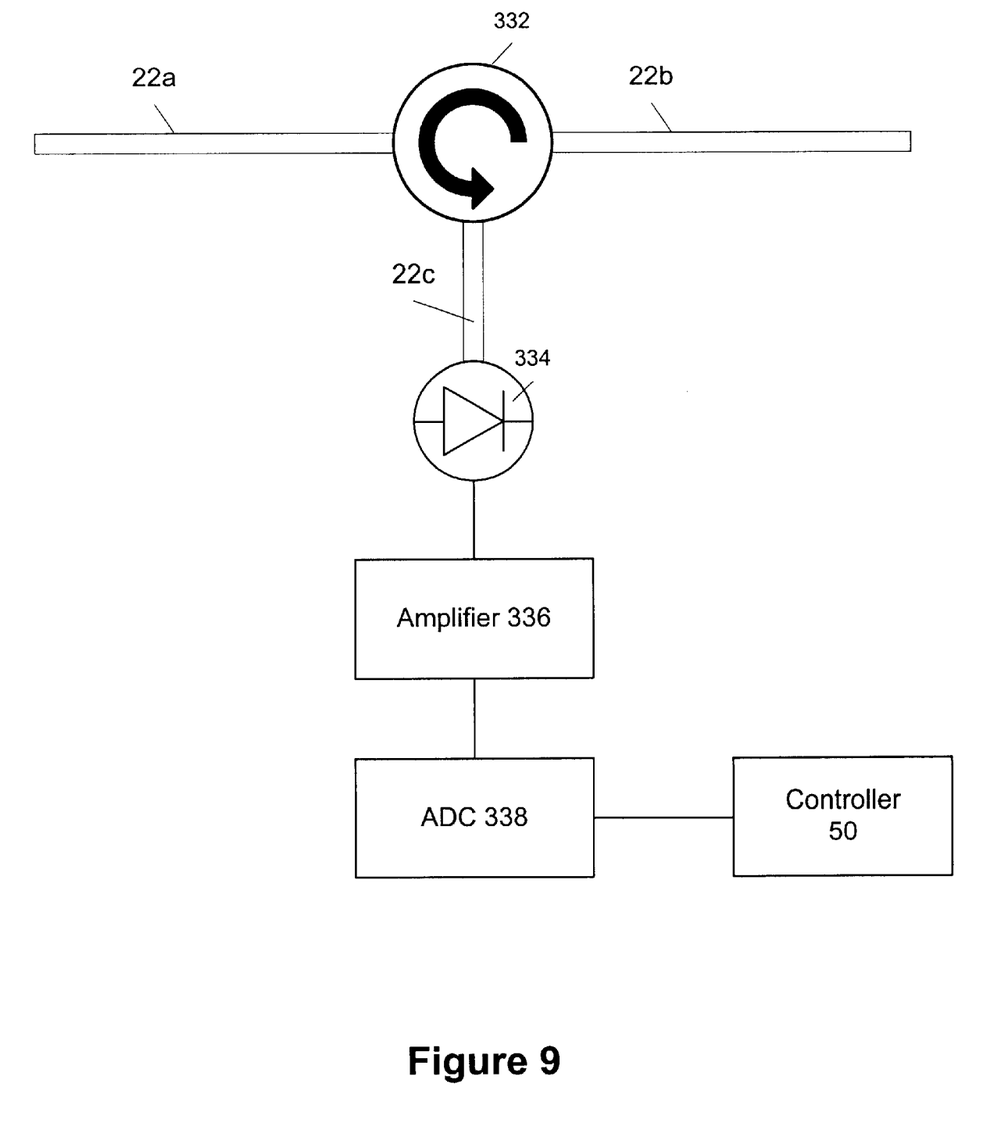
FIG. 9 illustrates a schematic of a first exemplary optical detector in accordance with the present invention.

FIG. 9 illustrates an exemplary arrangement for detecting back-reflected light in a fiber 22. As shown in FIG. 9, fiber 22 includes a segment 22a having a first end aligned or integrated with a micro-lens 32. A second end of segment 22a couples to an optical circulator 332. Circulator 332 also couples to ends of segments 22b and 22c. A second end of segment 22b couples to a light source (e.g., a light-emitting device, such as a laser). A second end of fiber 22c couples to a photodetector 334, such as a PIN diode or a metal-semiconductor-metal (MSM) photodiode. The photodetector 334 can be coupled to an amplifier 336, which can couple to an analog-to-digital converter (ADC) 338 before the detected signal enters controller 50, for example.

In operation, light generated by the light source is coupled to the circulator 332 by segment 22b. Circulator 332 couples the light from segment 22b to segment 22a, which couples the light to lens 32. Back-reflected light from segment 22a is coupled by circulator 332 to segment 22c. Photodetector 334 detects the back-reflected light on segment 22c. For example, photodetector 334 may generate an electric current indicative of the power of the back-reflected light. Amplifier 336 may be provided to amplify the output of photodetector 334. Amplifier 336 may be a transimpedance amplifier that generates a voltage signal based on an input from photodetector 334. ADC 338 converts the voltage of the amplifier 336 to a digital signal, which may be supplied to controller 50. Based on the output of the ADC 338, the controller 50 can determine whether the lens array and switching substrate 100 are properly aligned. For example, the controller 50 may determine that the substrate and lens array are properly aligned if a predetermined power level (e.g., a maximum power level) of back reflected light is detected in each fiber 22. Alternatively, the output of the photodetector 334, the amplifier 336, or the ADC 338 may be provided to a meter or other display that can be read by technicians while aligning the fiber/lens array and switching substrate.

Figure 10:
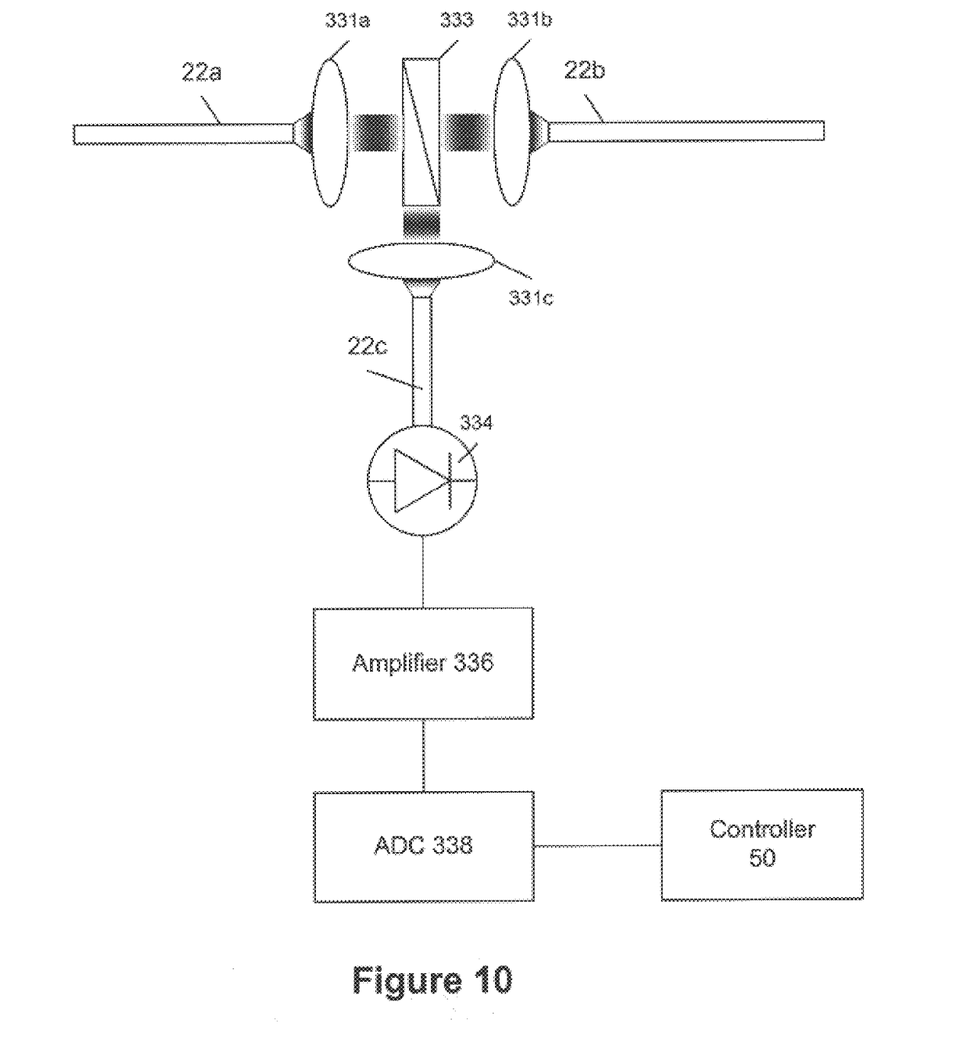
FIG. 10 illustrates a schematic of a second exemplary optical detector in accordance with the present invention.

FIG. 10 illustrates another exemplary arrangement for detecting back reflected light in a fiber 22. In accordance with FIG. 10, fiber segment 22a includes a first end aligned or integrated with a micro-lens 32 and a second end aligned or integrated with a lens 331a. Fiber segment 22b includes a first end coupled to a light source (not shown) and a second end aligned or integrated with a lens 331b. A beam splitter 333 is provided between lens 331a and lens 331b. A lens 331c is also provided in alignment with beam splitter 333. Lens 331c maybe aligned or integrated with fiber segment 22c. The remainder of the detector arrangement may be the same or similar to that described in connection with FIG. 9.

In operation, light generated by the light source is coupled to the lens 331b by segment 22b. The light passes through the beam splitter 333 and is inserted into segment 22a by lens 331a. Segment 22a couples the light to a lens 32 of lens array. Back-reflected light from segment 22a is coupled to beam splitter 333 through lens 331b. The beam splitter 333 reflects the back reflected light into segment 22c through lens 331c. Photodetector 334 detects the back reflected light. A signal indicative of the back reflected light may be supplied to controller 50. Based on the output of the signal, the controller 50 can determine whether the lens array and switching substrate 100 are properly aligned.

The detector arrangements of FIGS. 9 and 10 are intended to be illustrative. Of course, other mechanisms may be provided for detecting the back reflected light.

The alignment features of the present invention have been described primarily in connection with an optical switch having reflective switching elements. However, the alignment features and techniques described herein are applicable to the alignment of a fiber/lens array and other optical switching components, such as those used in liquid crystal optical switches and other types of optical switches that utilize free-space optics, to name just a few. Moreover, while the present invention has been described in connection with optical switch components, it should be appreciated that the alignment mechanisms described herein may be used to align various types of equipment. The alignment mechanisms may be used together with other alignment mechanisms. For example, the alignment mechanisms described herein may be used for fine positional adjustments while other mechanisms may be used for coarse adjustment.

It will be apparent to those skilled in the art that various modifications and variations can be made without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical switch comprising:
   a fiber/lens array including a plurality of input optical fibers carrying a plurality of input optical signals and a plurality of micro-lenses;
   a plurality of output optical fibers; and
   an optical switching mechanism for selectively coupling input optical signals from said plurality of input optical fibers to said plurality of output optical fibers, said optical switching mechanism including a switching substrate having a side facing said fiber lens array, the side having at least one alignment grating and a plurality of switching elements aligned with the micro-lenses, wherein the alignment grating is positioned to reflect an optical signal passing through at least one of the micro-lenses.

2. The optical switch according to claim 1, wherein said switching elements comprise movable micro-mirrors.

3. The optical switch according to claim 1, wherein said switching substrate and said fiber/lens array are oriented with respect to each other such that optical signals from the fiber/lens array are incident relative to the surface of the switching substrate at an angle α.

4. The optical switch according to claim 3, further comprising an optical detector for detecting a back-reflected optical signal in at least one of the plurality of input optical fibers, wherein the back-reflected optical signal is produced by the alignment grating.

5. The optical switch according to claim 3, wherein said alignment grating reflects a first order or higher-order component of an optical signal incident thereto at the angle $\alpha$.

6. The optical switch according to claim 1, wherein said switching elements and the alignment grating are provided in an array at a surface of the switching substrate.

7. A method of aligning a fiber/lens array and a switching substrate of an optical switch, wherein the fiber/lens array includes a plurality of optical fibers and a plurality of micro-lenses aligned with the optical fibers and the switching substrate includes a grating and a plurality of switching elements, the method comprising:

directing an optical signal having a predetermined wavelength through one of the optical fibers and through one of the micro-lenses in the direction of the switching substrate;

moving at least one of the fiber/lens array and the switching substrate such that the optical signal impinges on the grating;

detecting power of an optical signal reflected from the grating; and fixing the position of the fiber lens array and the switching substrate relative to each other when the detected power meets a predetermined optical power criterion, whereby the switching elements of the switching substrate are aligned with micro-lenses of the fiber/lens array.

8. The method according to claim 7, wherein the predetermined optical power criterion comprises a maximum optical power.

9. The method according to claim 8, wherein the predetermined optical power criterion comprises equaling or exceeding a threshold power value.

10. A method of aligning a fiber/lens array and a switching substrate of an optical switch, wherein the fiber/lens array includes multiple optical fibers and a multiple micro-lenses aligned with the optical fibers and the switching substrate includes a plurality of gratings and switching elements, the method comprising:

directing optical signals having a predetermined wavelengths through a plurality of the optical fibers and through the micro-lenses in the direction of the switching substrate;

moving at least one of the fiber/lens array and the switching substrate such that the optical signals impinge on the gratings; and detecting back-reflected optical signals in the plurality of optical fibers, wherein the gratings back-reflect at least a portion of the optical signals at the desired angular orientation between the fiber/lens array and the switching substrate.

11. The method according to claim 10, wherein the gratings reflect first order or higher-order components of the optical signals at the desired angular orientation.

12. The method according to claim 10, wherein the gratings are spaced apart on a periphery of a surface of the switching substrate.

13. The method according to claim 10, wherein the switching substrate comprises a micro-electromechanical system (MEMS) substrate, wherein the switching elements comprises movable micro-mirrors arranged in an array with the gratings on a surface of the substrate.

14. A combination comprising:

at least one light source for producing light of a predetermined wavelength;

a fiber/lens array comprising optical fibers and micro-lenses arranged in an array, a first plurality of the optical fibers for carrying the light from the at least one light source and a second plurality of the optical fibers for carrying optical information signals, each optical fiber associated with one of the micro-lenses to form a fiber/micro-lens pair; and a switching substrate having a surface facing the fiber/lens array, the surface including a plurality of switching elements and a plurality of gratings, wherein the gratings are aligned with the fiber/lens array to reflect the light from the at least one light source to predetermined positions away from the switching substrate and the switching elements are aligned with the fiberilens array to reflect the optical information signals from the second optical fibers.

15. The combination according to claim 14, wherein the gratings are designed to reflect the light to predetermined position on the fiber/lens array.

16. The combination according to claim 14, wherein the gratings are designed to reflect light back through the lenses and fibers from which the light passed before being reflected by the gratings.

17. The combination according to claim 16, wherein the back-reflected light comprises a first order or higher-order component of the light incident on the gratings.

18. A combination comprising:

a fiber/lens array comprising optical fibers and micro-lenses arranged in an array, each optical fiber associated with one of the micro-lenses to form a fiber/micro-lens pair;

at least one light source coupled to a first plurality of the optical fibers for producing light of a predetermined wavelength such that the light passes through the first optical fibers and associated micro-lenses, a second plurality of the optical fibers for carrying optical signals;

a first switching substrate having a surface facing the fiber/lens array, the surface including a plurality of switching elements and a plurality of gratings, wherein the gratings are aligned with the fiber/lens array to reflect the light from the at least one light source to predetermined positions away from the switching substrate; and a second switching substrate having a surface facing the first switching substrate, the surface including a plurality of switching elements, wherein the switching elements of the first switching substrate are aligned with the fiber lens array to selectively reflect optical signals from the second, optical fibers to selected switching elements of the second switching substrate.

19. The combination according to claim 18, wherein the predetermined positions comprise the lenses and fibers from which the light passed through before being reflected by the gratings.

20. The combination according to claim 19, wherein the light reflected to the predetermined position comprises a first order or higher-order component of the light incident on the gratings.

* * * * *